F. TOMPKINS.

CAR BRAKE AND STARTER.

No. 10,733. Reissued June 8, 1886.

WITNESSES:

Donn Trotchell

C. Sedgwick

INVENTOR:

Frank Tompkins

BY

Munn & Co.

ATTORNEYS.

N. PETERS, Photo-Lithographer, Washington, D. C.

UNITED STATES PATENT OFFICE.

FRANK TOMPKINS, OF NEW YORK, N. Y.

CAR BRAKE AND STARTER.

SPECIFICATION forming part of Reissued Letters Patent No. 10,733, dated June 8, 1886.

Original No. 299,296, dated May 27, 1884. Application for reissue filed August 11, 1885. Serial No. 174,153.

*To all whom it may concern:*

Be it known that I, FRANK TOMPKINS, of the city, county, and State of New York, have invented a new and Improved Combined Car-Brake and Car-Starter, of which the following is a full, clear, and exact description.

The object of my invention is to provide a new and improved car-brake in which the energy of the car is stored by applying the brake, which stored energy can be used for starting the car.

The invention consists in the combination, with the front axle of a car, of a ribbed wheel mounted on the same and sliding sleeves on the said axle, which sleeves are provided with ribbed disks adapted to engage with the ribbed wheel, on which sleeves chains are fastened, which are connected with an air-compressing piston contained in a cylinder, to which piston a rack is pivoted which can engage with a ratchet-wheel on the rear axle, for the purpose of revolving the rear axle when the piston is forced outward by the compressed air.

The invention further consists in two pivoted levers for pressing the ribbed disks on the sleeves against the ribbed wheel, which levers have their outer ends connected with the brake-shaft by means of chains, whereby the outer ends of the said levers can be pressed together by turning the brake-shaft.

The invention also consists in parts and details and combinations of the same, as will be fully described and set forth hereinafter.

Reference is to be had to the accompanying drawings, forming part of this specification, in which similar letters of reference indicate corresponding parts in all the figures.

Figure 1:
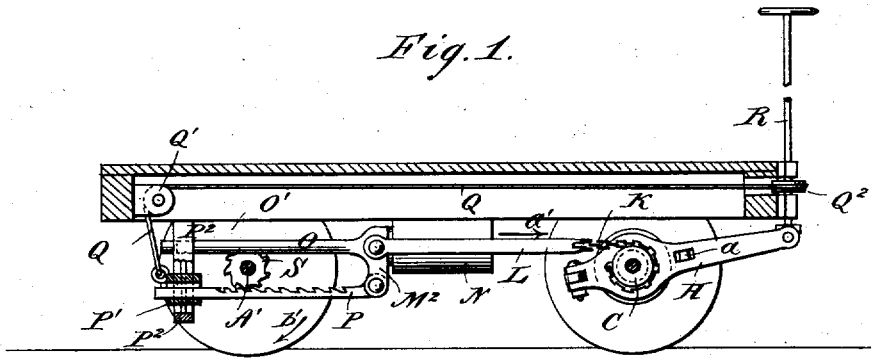
Figure 2:
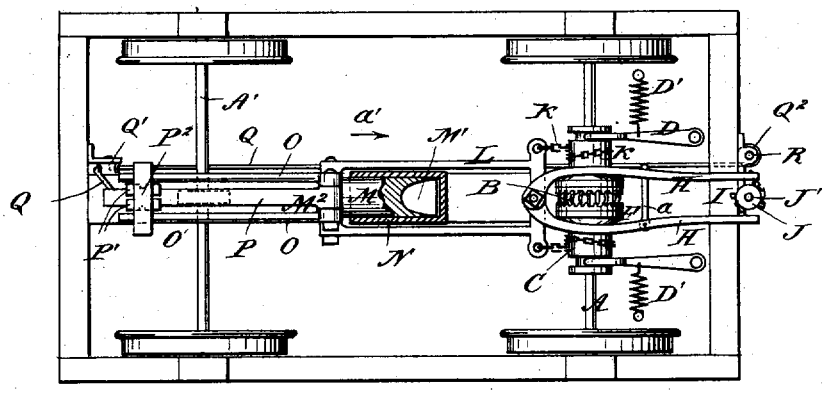
Figure 4:
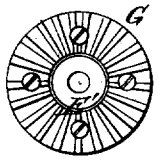
Figure 3:
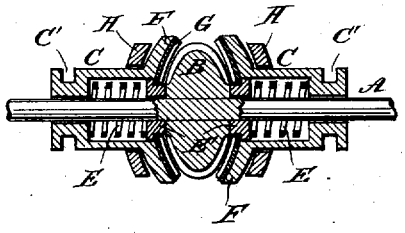
Figure 5:
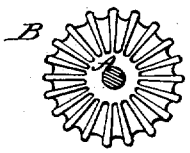

Figure 1 is a longitudinal sectional elevation of a car provided with my improved combined car-brake and car-starter. Fig. 2 is a plan view of the under side of the same, parts being broken out and others shown in section. Fig. 3 is an enlarged detail longitudinal sectional elevation of the clutching device. Fig. 4 is a side elevation of one of the ribbed clutching-disks on the sliding clutching-sleeves. Fig. 5 is a side view of the ribbed wheel mounted on the axle.

On the front axle, A, of the car a ribbed wheel, B, is mounted, which has an elliptical cross-section, the ribs extending from one side across the rounded edge to the other, as shown, and the said ribs being arranged radially.

On each side of the ribbed wheel B a sleeve, C, is mounted to slide on the axle in the direction of its length, each of which sleeves is provided at its outer end with an annular groove, C′, adapted to receive the forked end of a lever, D, which is pivoted to the car-floor, and is adapted to swing in the horizontal plane, which levers D are each connected to a spring, D′, secured to the under side of the car, which springs D′ draw the sleeves C in the direction from the ribbed wheel B. Within each sleeve a spiral spring, E, is held, the outer end of which spring rests against an apertured disk, E′, through which axle A passes, which disk is provided with a flange, which prevents it from being pressed out of the inner end of the sleeve.

On the inner ends of the sleeves C curved annular flanges F are provided, to the inner surfaces of which ribbed annular plates G are fastened, which are curved in such a manner that they can fit against the curved sides of the wheel B. The sleeves C pass through apertures in two broad levers or plates, H, pivoted to each other at their inner ends—that is, beyond the axle A—the front ends of the levers H being secured to two chains, I, secured to opposite parts of a disk or wheel, J, on the lower end of a brake-shaft, J′. A cross-bar, *a*, pivoted to one of the levers H, passes through a longitudinal slot or aperture in the other lever. The levers H rest on the sleeves C. Two chains or cables, K, are secured on the sleeves C, which act as drums, and are wound around the same, the said chains having their rear ends secured to the inner ends of a frame, L, having opposite ends secured on the front end of a piston or plunger, M, contained in a cylinder, N, held on the under side of the car, which plunger is provided at the inner end with a recess or aperture, M′.

To the front end of the plunger or piston M guide-rods O are secured, which are guided in suitable guide-apertures, O′, in the upper part of the vertical guides $P^2$, secured to the under side of the car.

To the lower end of a head, $M^2$, formed on the front end of the piston or plunger M, a rack, P, having inclined teeth in its upper edge, is pivoted. The free end of the rack P, which is at the rear end of the car, is passed through a box or loop, P′, held to slide vertically between two vertical guides, $P^2$, projecting downward from the bottom of the car.

To the box or loop P′ a chain or cable, Q, passing over a pulley, Q′, at the rear end of the car, is fastened, which cable passes over the pulley $Q^2$ of a brake-shaft, R, on the front end of the car.

On the rear axle, A′, a ratchet-wheel, S, is mounted, with which the rack P is adapted to engage.

The operation is as follows: If the speed of the car is to be checked, the sleeves C C are moved toward the ribbed wheel B by turning the brake-shaft J′ in such a manner that the outer ends of the levers H will be moved toward each other, the disks E′ will be pressed against the middle smooth parts of the wheel B, and the friction produced will be sufficient to check the speed of the car to a certain extent. Then the levers H are pressed nearer together, whereby the disks E′ will be pressed inward, and the ribbed disks G will engage with the ribbed wheel B, whereby the sleeves C will be rotated by the axle A in such a manner as to wind the chains K on the said sleeves, thereby drawing the frame L in the direction of the arrow *a′* and compressing the air in the cylinder N. The speed of the car must first be checked by means of the disks E′, as otherwise the ribs of the wheel B and the disks G might be broken if brought in contact when the car is going at full speed. The power consumed in compressing the air in the cylinder N—that is, in forcing the piston M into the said cylinder—checks the speed of the car, and finally stops the same. If the car is to be started, the brake-shaft R has to be turned to wind the cable or chain Q on the same, whereby the rack P will be raised, and will engage with the ratchet-wheel S. Then the brake-shaft J′ is turned in such a manner as to unwind the chains I, secured on the disk J, thus permitting the springs D′, acting on the forked levers D, to draw the sleeves C from the ribbed wheel B, whereby the said sleeves will be disengaged from the front axle, A. The compressed air in the cylinder N expands and forces the piston or plunger M outward in the inverse direction of the arrow *a′*, and turns the rear axle, A′, in the direction of the arrow *b′*, thereby driving the car forward. Then the rack P is disengaged from the ratchet-wheel S, and the car runs on in the ordinary manner. The plunger is provided with a recess, M′, in its inner end for the purpose of catching the air, preventing the escape of the same, and forming a better cushion.

Having thus described my invention, I claim as new and desire to secure by Letters Patent—

1. In a combined car-brake and car-starter, the combination, with a ribbed wheel mounted on the front axle, of sliding sleeves provided with ribbed disks adapted to engage with the ribbed wheel, means for engaging the ribbed disks with the ribbed wheel, a plunger or piston connected with the said sleeves and adapted to compress air in a cylinder, a ratchet-wheel mounted on the rear axle, a rack connected with the piston and adapted to be engaged with the ratchet-wheel on the rear axle, and of means for engaging the rack with the said ratchet-wheel, substantially as herein shown and described.

2. In a combined car-brake and car starter, the combination, with a ribbed wheel mounted on the front axle, of sliding sleeves mounted on the front axle and provided with ribbed disks adapted to engage with the ribbed wheel, two pivoted levers through which the sleeves pass, a brake-shaft for drawing the outer ends of the levers together and pressing the ribbed disks against the outer faces of the ribbed wheel, springs for drawing the ribbed disks from the ribbed wheel, chains secured on the sleeves, a piston connected with the said chains, a cylinder in which the piston works, a ratchet-wheel mounted on the rear axle, a rack adapted to engage with the said ratchet-wheel, and means for engaging the ratchet-wheel and rack, substantially as herein shown and described.

3. In a combined car-brake and car-starter, the combination, with the front axle, of a ribbed wheel mounted on the same, sliding sleeves mounted on the axle and provided with ribbed disks adapted to engage with the ribbed wheel, means for engaging the ribbed disks with the ribbed wheel, chains secured on the sleeves and connected with the piston M, contained in the cylinder N, guide-rods O, projecting from the piston, the ratchet-wheel S on the rear axle, the rack P, hinged to the head of the piston, and of means for engaging the said rack with the ratchet-wheel S, substantially as herein shown and described.

4. In a combined car-brake and car-starter, the combination, with the front axle, of a ribbed wheel mounted on the same, sliding sleeves mounted on the axle and provided with ribbed disks adapted to engage with the ribbed wheel, means for engaging the ribbed disks with the ribbed wheel, chains secured on the sleeves and connected with the piston M, contained in the cylinder N, guide-rods O, projecting from the piston, the ratchet-wheel S on the rear axle, the rack P, hinged to the head of the piston, the rope or chain Q, secured to the free end of the brake-shaft, the pulley Q′, and the shaft R, on which the free end of the rope is fastened, substantially as herein shown and described.

5. In a combined car-brake and car-starter, the combination, with the front axle, A, of the ribbed wheel B on the same, the sliding sleeves C, provided with ribbed disks adapted te engage with the ribbed wheel B, the levers H, pivoted to each other, the chains I, fastened to the outer ends of the levers H, the shaft J′, the wheel J, mounted on the shaft J′, to which wheel the ends of the chains I are fastened, the chains K, secured on the sleeves C, a piston connected with the chains and working in a cylinder, and means for revolving the rear axle from the said piston, substantially as herein shown and described.

6. In a combined car-brake and car-starter, the combination, with the front axle, A, of the ribbed wheel B, mounted on the same, the sliding sleeve C, provided with ribbed disks adapted to engage with the wheel B, the pivoted levers H, the chains I, the shaft J′, the forked levers D, pivoted to the car-bottom and passing into grooves in the sleeves C, and of springs D′, for withdrawing the sleeves from the ribbed wheel, chains K, secured on the sleeves C, and of the piston connected with the chain and working in a cylinder, and means for revolving the rear axle from the said piston, substantially as herein shown and described.

7. In a combined car-brake and car-starter, the combination, with the axle A, of the ribbed wheel B, mounted on the same, the sliding sleeves C, having end disks, F, the ribbed plates G, secured to the end disks, and means for engaging the ribbed plates G with the ribbed wheel B, means for operating an air-compressing piston contained in a cylinder, and means for operating the rear axle from the said piston, substantially as herein shown and described.

8. In a combined car-brake and car-starter, the combination, with the axle A, of the ribbed wheel B, mounted on the same, the sliding sleeve C, having ribbed end disks, the disks E′, held in the sleeve, the springs E for pressing the end disks against the ribbed wheel, and of means for engaging the ribbed disks with the ribbed wheel, means for operating an air-compressing piston contained in a cylinder from the sleeves on its front axle, and means for revolving the rear axle from the said piston, substantially as herein shown and described.

9. In a combined car-brake and car-starter, the combination, with the front axle, of a ribbed wheel mounted on the same, sliding sleeves mounted on the axle and provided with ribbed disks adapted to engage with the ribbed wheel, friction-disks held in the inner ends of the sleeves, springs for pressing the friction-disks against the middle of the ribbed wheel before the ribbed disks engage with the ribbed wheel, means for operating an air-compressing piston from the said sleeves, and means for operating the rear wheel from the said piston, substantially as herein shown and described.

10. In a combined car-brake and car-starter, the combination, with a cylinder and air-compressing piston therein, of means for operating the piston, the rack P, pivotally connected with the piston, the ratchet-wheel S on the rear axle, the vertical guides $P^2$, secured to the under side of the car, the box or loop P′, sliding on the same, through which box or loop the rack P is passed, and of means for raising the said box or loop to engage the rack with the ratchet-wheel S on the rear axle, substantially as herein shown and described.

11. In a combined car brake and starter, the combination, with a cylinder and air-compressing piston therein, of means for operating the piston, the guide-rods O of the piston passing through perforations in the upper part of guides $P^2$, the rack P, pivoted to arm $M^2$ of the piston, the ratchet-wheel S on the rear axle, the vertical guides $P^2$, the box or loop P′, sliding within the same, through which box or loop the rack P is passed, and of means for raising the said loop to engage the rack with the ratchet-wheel S on the rear axle, substantially as set forth.

12. The combination, with the axle, of a ribbed clutch-wheel mounted rigidly on the same, and of loose double-acting clutch sleeves mounted to slide on the said axle, which sleeves are provided with ribbed plates at their flanged or disk ends facing the sides of the said fixed clutch-wheel, and of means for engaging the said loose clutch-sleeves with the said fixed ribbed clutch-wheel, substantially as herein shown and described.

13. The combination, with the axle, of a ribbed clutch-wheel mounted rigidly on the same, double-acting flanged sleeves provided with ribbed plates and mounted to slide loosely on the said axle, sliding friction-disks projected from the said sleeves by means of springs through the apertured plates at the flanged ends of the said sleeves facing the said fixed clutch-wheel, and of means for engaging the said loose clutch-sleeves with the said fixed clutch-wheel, substantially as herein shown and described.

14. The combination, with the axle A, of the ribbed wheel B, mounted rigidly on the said axle, the double-acting axle clutch-sleeve C, mounted to slide loosely on the said axle, and provided with the ribbed plate G, bolted to its terminal disk or flange F, the sliding friction-disk E′, the springs E within the said sleeve, and the operating-lever H, substantially as herein shown and described.

15. In a car-brake, the combination, with the axle, of a fixed ribbed wheel or block, B, thereon, and flanged sleeves C, having removable ribbed plates G, for engagement with the ribbed wheel B, substantially as shown and described.

16. The combination, with the axle, of a rigid clutch-wheel and double-acting clutch-sleeves having ribbed flanges adapted to engage the said rigid wheel, substantially as herein shown and described.

17. The combination, with the axle, of a rigid wheel, B, clutch-sleeves C, and friction-disk E′, substantially as herein shown and described.

18. The combination, with the axle, clutch devices, and brake-shaft, of the apertured levers H, substantially as herein shown and described.

19. The combination, with the car-axle, and with a rigid clutch-wheel, B, of double-acting clutch-sleeves C, levers D, and springs D′, substantially as herein shown and described.

20. The combination, with the car-axle, of a rigid clutch-wheel, double-acting clutch-sleeves, and springs surrounding the axle within the sleeves, substantially as herein shown and described.

21. A car-brake consisting of a rigid wheel or block on the car-axle, a friction-disk, and a spring adapted to bring the disk and wheel or block into frictional contact, substantially as shown and described.

22. The combination, with the double-acting clutch, of the spring E, substantially as shown and described.

23. The combination, with the car-axle, of a rigid clutch-wheel, double-acting clutch-sleeves having ribbed flanges adapted to engage with the rigid wheel, a friction-disk, a power-storage chamber, and mechanism for operating the connecting-piston from the said clutch mechanism, substantially as herein shown and described.

24. In a combined car brake and starter, the combination of a double-acting clutch on the axle, a power-storage chamber and piston, and mechanism connecting the clutch-sleeves with the storage-power piston, whereby the latter is operated by the revolving motion of the clutch-sleeves, substantially as set forth.

25. In a combined car brake and starter, the power-storage piston operated from the revolving motion of double-acting clutch-sleeves on the axle, substantially in the manner and for the purpose set forth.

FRANK TOMPKINS.

Witnesses:
OSCAR F. GUNZ,
EDGAR TATE.